United States Patent [19]

Augé et al.

[11] Patent Number: 4,986,629
[45] Date of Patent: Jan. 22, 1991

[54] MONOMODE OPTICAL FIBER WITH PROTECTION AGAINST TAPPING OF TRANSMITTED INFORMATION, AND A TRANSMISSION METHOD USING SAID FIBER

[75] Inventors: Jacques Augé, Saint Cheron; Pascale Beaufumé, Orsay, both of France

[73] Assignee: Societe Anonyme dite: Compagnie Generale d'Electricite, Paris, France

[21] Appl. No.: 400,172

[22] Filed: Aug. 28, 1989

[30] Foreign Application Priority Data

Aug. 26, 1988 [FR] France .................... 88 11286

[51] Int. Cl.⁵ .............................................. G02B 6/22
[52] U.S. Cl. ................................................. 350/96.33
[58] Field of Search ........................... 350/96.33, 96.29

[56] References Cited

U.S. PATENT DOCUMENTS 4,000,416 12/1976 Goell ................................. 250/199
4,134,642 1/1979 Kapron et al. ................. 350/96.33

FOREIGN PATENT DOCUMENTS 0083843 7/1983 European Pat. Off. .

OTHER PUBLICATIONS

IBM Technical Discl. Bull., vol. 30, No. 12, pp. 34–37, "Tap Resistant Optical Fibers"; May 1988.

*Primary Examiner*—William L. Sikes
*Assistant Examiner*—Robert E. Wise
*Attorney, Agent, or Firm*—Sughrue, Mion, Zinn, Macpeak & Seas

[57] ABSTRACT

The core (2) of a monomode fiber is surrounded by a slightly monomode annular waveguide (6) guiding masking light having the same wavelength as the light conveyed by the core. The invention is particularly suitable for telecommunications.

10 Claims, 1 Drawing Sheet

A core for monomode propagation of an information light wave carrying an information signal, with the refractive index of the core being referred to as the "core" index; and

MONOMODE OPTICAL FIBER WITH PROTECTION AGAINST TAPPING OF TRANSMITTED INFORMATION, AND A TRANSMISSION METHOD USING SAID FIBER

The present invention relates to transmitting information and more particularly to protecting such transmission from attempts at tapping. Unfortunately, it is not possible to provide absolute protection against such tapping. That is why the present invention seeks merely to make tapping more difficult and/or, if tapping does occur, to warn the transmitter and/or the receiver of the transmitted information.

BACKGROUND OF THE INVENTION

For transmission purposes, an information-carrying signal is generally put into electrical form, into the form of a radiated electromagnetic wave, or into the form of a guided light wave, with guided light waves generally being conveyed within a monomode optical fiber. Such a fiber conventionally comprises a core conveying the signal and optical cladding integral with the core, surrounding the core, and having a lower refractive index, thereby giving rise to an "evanescent" wave which also conveys the signal, but which is normally detectable only at a very short distance from the core.

The optical cladding is itself surrounded by an outer sheath which is different in nature and which provides mechanical and chemical protection.

Given the numerous advantages of monomode fibers (low loss, very high data rate, immunity from electromagnetic interference, ...), their use is becoming more and more widespread, including use in local networks. In addition, for information protection purposes, the guided optical nature of the signal makes an intrusion more difficult than when using conventional electric wires or when using a radiated electromagnetic link. That is why the present invention applies to said guided optical nature, and more precisely to guidance via a monomode fiber.

However, in local processing of a connection by melting together two fibers, it has recently been discovered that information can be tapped by means of curves or micro-curves which cause the phase velocity of a mode guided in the core to become less than the velocity of plane waves that may propagate in the outer sheath. If the fiber is curved, the phase velocity increases in proportion to distance from the center of curvature, and beyond a critical degree of curvature it exceeds the velocity of plane waves. Under such circumstances the evanescent wave is easily sensed.

Abrasive methods make it possible to come closer to the core and may also be used for tapping information since couplers for micromode fibers are based on this principle.

The object of the present invention is to provide effective protection for information being transmitted in a monomode fiber.

SUMMARY OF THE INVENTION

The present invention provides a monomode optical fiber with protection against tapping of transmitted information. The fiber comprises:

a core for monomode propagation of an information light wave carrying an information signal, with the refractive index of the core being referred to as the "core" index; and information-confining optical cladding surrounding said core monolithically and having a refractive index referred to as the "information confinement cladding index" which index is less than said core index, thereby confining said information wave in said core and allowing said wave to penetrate only evanescently into said cladding;

an annular waveguide surrounding said information confinement cladding monolithically and having a refractive index referred to as the "annular waveguide index" which is greater than said information confinement cladding index, thereby enabling an auxiliary light wave to propagate along said annular waveguide and to penetrate only evanescently into said information confinement cladding substantially without interfering with said information wave; and auxiliary confinement cladding surrounding said annular waveguide monolithically and having a refractive index referred to as the "auxiliary cladding index" which is less than said annular waveguide index, thereby confining said auxiliary wave in said waveguide;

said annular waveguide preferably constituting a slightly multimode waveguide for light having the same wavelength as the length which is multimode-guided by said core in order to constitute said information wave therein.

The number of modes of said light that are guided with low attenuation in said annular waveguide preferably lies in the range 2 to 10.

The radius (a) of said core preferably lies in the range 3.8 micrometers to 4.6 micrometers, with the thickness (b-a) of said information confinement cladding lying in the range 20 micrometers to 24 micrometers, the thickness (c-b) of said annular waveguide lying in the range 2.7 micrometers to 3.3 micrometers, and said core index and said annular waveguide index being greater than said information confinement index by index increments (δn) lying in the range 0.0045 to 0.0055. This range of structural parameter values is preferred when the light used has a wavelength of about 1.3 micrometers, and may readily be adapted to other wavelengths.

The wavelength of said light preferably lies in the range 0.5 micrometers to 3 micrometers, and more particularly for silica-based optical fibers in the range 0.5 micrometers to 1.6 micrometers, e.g. close to 1.3 micrometers.

The present invention also provides a transmission method providing protection against information tapping, the method comprising transmitting an information signal in the form of an information light wave guided in the core of a monomode optical fiber, said method being characterized by the fact that said fiber is a fiber of the invention as defined above, said method further including injecting a masking wave into said annular waveguide in order to constitute said auxiliary wave.

Said masking wave is preferably a light wave having the same wavelength as said information wave and conveying a masking signal.

BRIEF DESCRIPTION OF THE DRAWINGS

An implementation of the invention in compliance with the above definition is described in greater detail below by way of non-limiting example and with reference to the accompanying diagrammatic figures. When the same item appears in more than one figure, it is designated therein by the same reference symbol. In the figures.

DETAILED DESCRIPTION

In the figures, the fiber core is referenced 2, the information confinement cladding is referenced 4, the annular waveguide is referenced 6, and the auxiliary confinement cladding is referenced 8, with the radius of the core being a, and the inside and outside radii of the waveguide being b and c, respectively.

Figure 1:
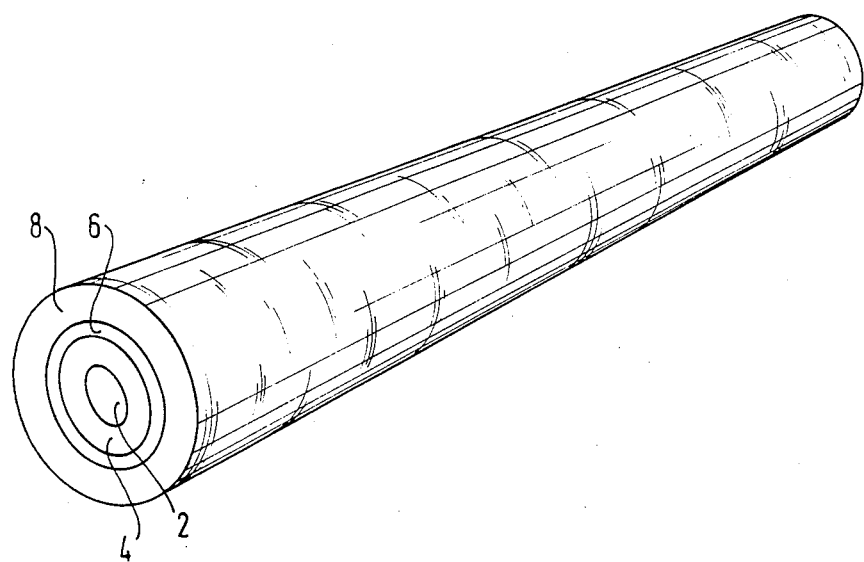
FIG. 1 is a perspective view of a fiber in accordance with the invention.
Figure 2:
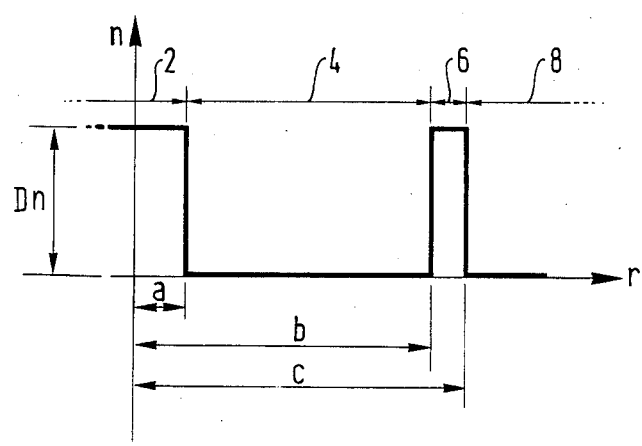
FIG. 2 is a graph showing variation in the refractive index across a section of said fiber as a function of distance from the axis of the fiber.

In FIG. 2, the distance of a point from the axis of the fiber is plotted along a horizontal axis r and the refractive index of the point is plotted up a vertical axis n.

The refractive index profile is merely a so-called "step index" profile, both for the core and for the annular waveguide. A theoretical estimate of mode interference or "crosstalk" between the fundamental mode in the core $LP_{01}$ and the modes in the annular waveguide serves to define mean parameters for the structure suitable for guaranteeing good isolation (crosstalk coefficient of less than $-30$ dB):

core: $a = 4.2$ micrometers $\delta n = 5.10^{-3}$
annular waveguide: $c - b = 3$ micrometers $\delta n = 5.10^{-3}$
waveguide-core spacing: $b - a = 22$ micrometers.

Under such conditions, the annular waveguide is slightly multimode.

The definition of the central structure (the core) is compatible with conventional monomode fibers optimized for light having a wavelength in a spectrum window centered on about 1.3 micrometers, and the annular waveguide can propagate a few well-guided modes that do not interact with the core mode.

The information contained in the monomode core of such a fiber is protected by causing a masking signal to propagate parallel to the core using the modes of the annular waveguide. Any intrusion will necessarily pass via said annular waveguide which conveys a signal of no importance, and even if the core signal is indeed tapped, it will be mixed in with and masked by the signal in the annular waveguide.

The system for receiving the masking wave is installed at the end of the line. Any anomaly in the level of the received power can be detected and interpreted as representing energy being tapped. This system thus also makes it possible to act on the transmission of the information wave, thereby further increasing the degree of protection provided by said optical line.

It may be observed that proposals have already been made for providing an optical fiber which is protected against information tapping by surrounding a core with an annular waveguide which is at a distance therefrom. However, said core in said waveguide was highly multimode. Compared with this prior art fiber, a fiber of the invention has the advantage of propagating a single mode in the core (the fundamental mode $LP_{01}$) and only about ten modes in the annular waveguide with only the first half of these modes being well guided (having low attenuation over great distances), at least when using the set of structural parameters a, b, c, and $\delta n$ given above for use with the window at 1.3 micrometers. The advantage of this fiber lies in the fact that over the entire range of parameter values given, only the fundamental mode remains confined in the core, with higher order modes being distinctly localized in the annular waveguide. It has been observed that modifying the structural parameters within the range removes (or adds) one or two propagation modes in the annular waveguide. In conventional monomode fibers optimized for 1.3 micrometers, there are certain constraints on the parameters a and $\delta n$ for guaranteeing monomode operation and for preventing the next higher mode $LP_{11}$ from propagating. In a fiber of the invention, this problem does not exist since the $LP_{11}$ mode and all higher order modes are, so to speak, "sucked" into the annular waveguide.

The first five higher order modes which are well guided by the annular waveguide in decreasing order of their propagation constants are the following: $LP_{02}$, $LP_{11}$, $LP_{21}$, $LP_{31}$, and $LP_{41}$.

This applies to a wavelength of 1.3 micrometers in conjunction with a nominal index profile defined by the above-mentioned structural parameter values. If this profile is changed too much, then the above results are no longer obtained. For example, the following three fibers can be mentioned as extreme cases which are unsuitable for implementing the present invention:

| First unsuitable fiber | |
|---|---|
| core | annular waveguide |
| $a = 5$ micrometers | $c-b = 5$ micrometers |
|  | $b-a = 5$ micrometers |
| $\delta n = 5.10^{-3}$ | $\delta n = 5 \cdot 10^{-3}$ |

By being too close to the core, a mode configuration arises in which energy is split between the core and the annular waveguide, even at the fundamental mode $LP_{01}$.

| Second unsuitable fiber | |
|---|---|
| core | annular waveguide |
| $a = 5$ micrometers | $c-b = 5$ micrometers |
|  | $b-a = 15$ micrometers |
| $\delta n = 5.10^{-3}$ | $\delta n = 10 \cdot 10^{-3}$ |

By increasing the value of $\delta n$ in the annular waveguide, the annular waveguide "takes over" and conveys the fundamental mode. The same phenomenon occurs if the annular waveguide is made a few micrometers wider.

| Third unsuitable fiber | |
|---|---|
| core | annular waveguide |
| $a = 5$ micrometers | $c-b = 1.5$ micrometers |
|  | $b-a = 24.3$ micrometers |
| $\delta n = 5.10^{-3}$ | $\delta n = 4\frac{1}{2} \cdot 10^{-3}$ |

Unlike the second fiber above, reducing the width of the annular waveguide and reducing its index increment has the effect of greatly reducing the propagation constants of the higher order modes, thereby greatly altering their guidance.

We claim:

1. In an optical fiber having protection against information tapping, the fiber comprising:
   a core having a core refractive index for enabling an information light wave of given wavelength carrying an information signal to propagate;
   information confinement optical cladding surrounding the core monolithically and having an information confinement cladding refractive index less than said core refractive index for confining said information wave in said core and allowing said wave to penetrate only evanescently into said cladding;

an annular waveguide surrounding said information confinement cladding monolithically and having an annular waveguide refractive index which is greater than said information confinement refractive cladding index and enabling an auxiliary lightwave to propagate in said annular waveguide;

auxiliary confinement cladding monolithically surrounding said annular waveguide and having an auxiliary cladding refractive index less than said annular waveguide refractive index for confining said auxiliary wave in said waveguide;

said annular waveguide constituting a multimode waveguide for light having the same wavelength as the light which is monomode-guided by said core in order to constitute said information wave therein, the improvement comprising said annular waveguide thickness much that said auxiliary wave in said annular waveguide has a limited number of propagation modes in the range of 2 to 10 and said core having a diameter such that said information wave in said core has only one propagation mode.

2. A fiber according to claim 1, wherein the radius of said core lies in the range 3.8 micrometers to 4.6 micrometers, the thickness of said information confinement cladding lies in the range 20 micrometers to 24 micrometers, the thickness of said annular waveguide lies in the range 2.7 micrometers to 3.3 micrometers, and said core refractive index and said annular waveguide refractive index are greater than said information confinement cladding refractive by an index increment lying in the range 0.0045 to 0.0055.

3. A fiber according to claim 1, wherein the given wavelength of said light lies in the range 0.5 micrometers to 3 micrometers.

4. A fiber according to claim 3, wherein the given wavelength of said light is about 1.3 micrometers, and said fiber is silica based fiber.

5. A method of transmission with protection against information tapping, the method comprising transmitting an information signal in the form of an information lightwave guided by the core of a monomode optical fiber, wherein said fiber is a fiber according to claim 1, and said method further including injecting said auxiliary wave into said annular waveguide in order to constitute a masking wave and/or a wave for detecting intrusion.

6. A method according to claim 5, wherein said auxiliary wave has the same wavelength as said information wave and conveys a masking signal.

7. In an optical transmission system comprising:
a main optical source for supplying an information wave having a wavelength and carrying an information signal which is to be transmitted without tapping,
an auxiliary optical source for supplying an auxiliary wave having said wavelength,
an optical fiber for receiving and guiding said information wave and said auxiliary wave,
and at least a main optical receiver for receiving said information wave guided by said optical fiber,
said optical fiber comprising:
a core receiving said information wave, said core having a given diameter and a core refractive index;
an information confinement cladding surrounding said core having an information confinement cladding index less than said core refractive index, thereby confining said information wave in said core;
an annular waveguide surrounding said information confinement cladding and having a given thickness and a refractive index greater than said information confinement cladding refractive index, said annular waveguide receiving said auxiliary wave; and
an auxiliary confinement cladding surrounding said annular waveguide and having a refractive annular cladding index less than said annular waveguide refractive index, thereby confining said auxiliary wave in said annular waveguide, the improvement comprising said annular waveguide thickness being such that said auxiliary wave in said annular waveguide has a limited number of propagation modes in the range of 2 to 10, and said diameter of said core being such that said information wave in said core has only one propagation mode.

8. A system according to claim 7, wherein the radius of said core lies in the range of 3.8 micrometers to 4.6 micrometers, the thickness of said information confinement cladding lies in the range of 20 micrometers to 24 micrometers, the thickness of said annular waveguide lies in the range of 2.7 micrometers to 3.3 micrometers, and said core refractive index and said annular waveguide index are greater than said information confinement cladding refractive index by an index increment lying in the range 9. A system according to claim 1, wherein the given wavelength of said light lies in the range of 0.5 micrometers to 3 micrometers.

10. A system according to claim 9, wherein the given wavelength of said light is about 1.3 micrometers, and said fiber is a silica-based fiber.

* * * * *